PLURAL MOTOR TENSIONING DEVICE WITH BRAKING
Filed Sept. 19, 1960
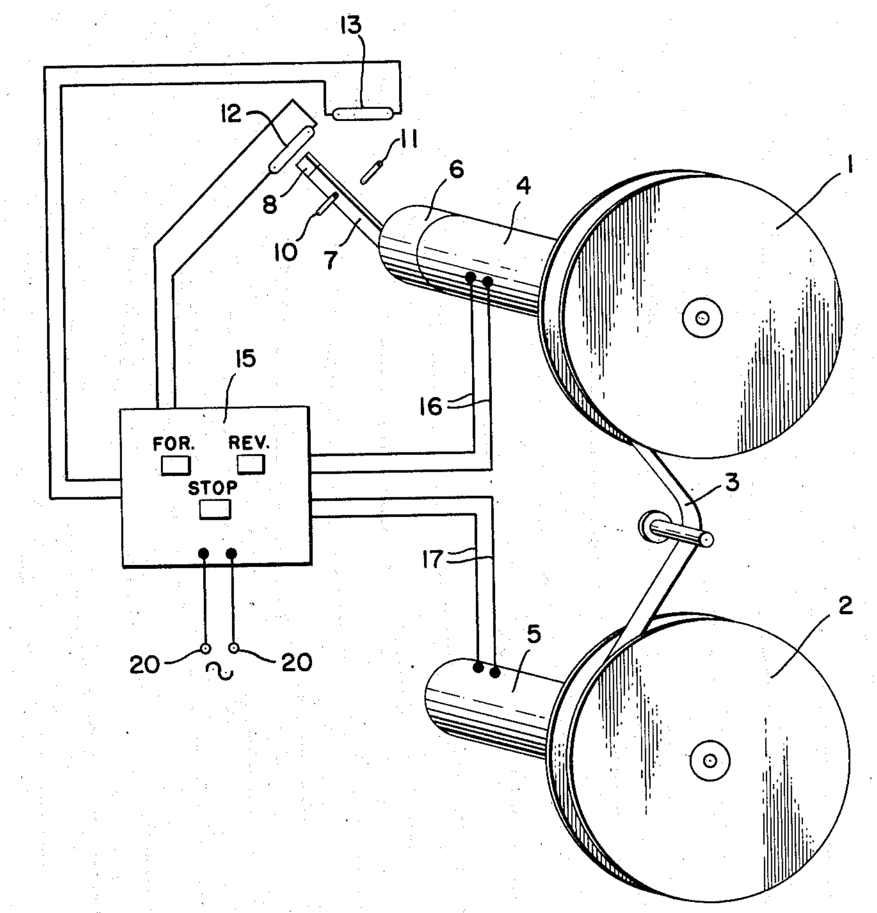
INVENTORS.
TERENCE J. WESTLAKE
MARTIN M. CARPENTER
BY Arthur H. Swanson
ATTORNEY.

United States Patent Office
3,130,357
Patented Apr. 21, 1964

3,130,357

PLURAL MOTOR TENSIONING DEVICE WITH BRAKING

Terence J. Westlake, Laurel, and Martin M. Carpenter, West Hyattsville, Md., assignors to Minneapolis-Honeywell Regulator Company, Minneapolis, Minn., a corporation of Delaware Filed Sept. 19, 1960, Ser. No. 56,856
6 Claims. (Cl. 318—7)

This invention relates to electrical recorders. More specifically, the present invention relates to transport control means for a web member.

An object of the present invention is to provide an improved transport control means for controlling the motion of a web member between two storage reels.

Another object of the present invention is to provide an improved transport control means to control the stopping of the motion of a web member whereby to prevent the stretching and/or spilling of the web member.

A further object of the present invention is to provide an improved transport control means, as set forth herein, which is characterized by simplicity of operation and construction.

In accomplishing these and other objects, there has been provided, in accordance with the present invention, a transport control means for controlling the motion of web member in passing between two web storage reels. Each of the storage reels has a drive motor to drive the corresponding reels in fixed and opposite directions but with a varying amount of torque. The direction of motion of the web is controlled by the application of a greater torque to one reel than to the other reel. The web is stored on the reel having the greater supplied torque and is removed from the reel having the smaller supplied torque. In order to stop the motion of the web, the motion of the web is retarded by decreasing the large supplied torque and increasing the small supplied until the torque ratio is reversed. At the point of torque reversal, the web is in a stationary condition and is, subsequently, induced to acquire an opposite direction of motion with respect to its initial direction of motion. This reversal is sensed to terminate the torque supplied to the storage reels and to retain the web in its stationary condition.

A better understanding of the present invention may be had from the following description when read in connection with the accompanying single figure which is a schematic representation of a transport control utilizing the present invention.

Referring to the single figure in more detail, there is shown a transport control utilizing a pair of storage reels 1 and 2. A moving web 3 is transported between the storage reel 1, 2 through the effect of a pair of reel drive motors 4, 5. A first reel motor 4 is used to drive a first reel 1 in a fixed direction. A second reel motor 5 is used to drive a second reel 2 in fixed direction which is opposite to the direction of motion of the first reel 1. A slipping clutch 6 is connected to the first motor 4 to drive an arm 7 having a magnet 8 attached to a free end thereof. The arm 7 is driven in the same direction as the first reel 1 against one of a pair of limit stops 10, 11. Thus, the arm 7 is driven by the motor 4 in the direction of the first reel 1 until the arm 7 encounters one of the limit stops 10, 11. The arm 7 is, subsequently, held against the limit stop while the slipping clutch 6 allows the motor 4 to continue the motion of the first reel 1.

A pair of magnetically responsive switches 12, 13 are positioned adjacent to the limit stops 10, 11. The switches 12, 13 may be any suitable magnetic switches, such devices being well-known in the art. The switches 12, 13 are each positioned to be affected by the magnet 8 when the arm 7 is against a corresponding one of the limit stops 10, 11.

The switches 12, 13 are each connected to a motor control 15 which control distributes the energizing signals to the reel motors 4, 5. Thus, a first energizing signal from the motor control 15 is applied to the first reel motor 4 through a first pair of connecting leads 16; and, similarly, a second signal is applied to the second motor 5 through a second pair of leads 17. The motor control 15 may be any suitable device for controlling the amplitude ratio of a pair of output signals, such devices being well-known in the art. For example, the motor control 15 may be a pair of motor driven potentiometers for varying the amplitude ratio of the output signals and predetermined rest, or home, positions as determined by limit switches. The motor control 15 has a plurality of pushbuttons for controlling the application of the energizing signals, in combination with the switches 12, 13, to the reel motors 4, 5. A pair of terminals 20 are used to connect the motor control 15 to a source of energizing power for the motors 4, 5.

Assume the Forward pushbutton on the motor control is depressed. This pushbutton is effective to apply a pair of energizing signals to the motors 4, 5. Assume the forward direction of the web 3 is from the first reel 1 to the second reel 2. Thus, the energizing signal applied to the second motor 5 is greater than the signal applied to the first motor 4. The second motor, consequently, rotates, the second reel 2 against the torque of the first motor 4 which is attempting to rotate the first reel 1 in a direction against the forward motion of the web 3. Accordingly, the torque of the first motor 4 is effective to brake the motion of the first reel 1 and to prevent an uncontrolled advance of the web 3 by the second motor 5.

The arm 7 is positioned against a first stop 10 by the motion of the clutch 6 corresponding to the direction of rotation of the first reel 1. This position is effective to close a first switch 12, which closure may be used to maintain the forward motion of the web 3. The stopping of the web 3 is initiated by depressing the Stop pushbutton. This pushbutton is effective to change the amplitude ratio of the signals supplied to the motors 4, 5. Specifically, the amplitude ratio of the applied signals is changed to reverse the ratio discussed above with relation to the forward motion of the web 3. Thus, the torque exerted by the second motor 5 is decreased and the torque exerted by the first motor 4 is increased. Since, the two torques are varied toward an equality, the net torque to drive the web 3 approaches a zero level, and the web 3 slows down in its forward motion. At the point of torque equality, the web 3 is brought to a stationary condition since the opposing torques cancel and prevent any motion of the reels 1, 2. A continuing variation of the energizing signal in this same direction is effective to reverse the amplitude ratio of the energizing signal so that the torque on the first reel 1 begins to overcome the torque on the second reel 2. The net torque, consequently, is now effective to reverse the direction of motion of the web 3. However, as soon as the web 3 starts to reverse its direction, the first motor 4 starts to rotate in a direction which is opposite to that existing in the forward motion of the web 3. This motion of the first motor 4 is transmitted through the clutch 6 to the arm 7. The arm 7 is, accordingly, moved to a position against the second limit stop 11 which position is effective to close the second magnetic switch 13 and to open the first switch 12. The opening of the first switch 12 is effective to terminate the energizing signals to the reel motor 4, 5. Inasmuch as the web 3 was effectively still in a stationary condition, the termination of the signals to the motor 4, 5 is effective to leave the tape in the desired stopped, or stationary, condition.

The operation of the apparatus of the present invention between a reverse mode of operation and a desired stopped condition is similar to that described above in relation to the forward mode of operation with the exception that the forward is maintained by the closure of the second switch 13 and is terminated by an opening of the second switch 13 through the motion of the arm 7.

Accordingly, it may be seen that there has been provided, in accordance with the present invention, a transport control for controlling the motion of a moving web between two storage reels and for controlling the stopping of the motion of the web whereby to control the stretching and/or spilling of the web.

What is claimed is:

1. A control apparatus for a moving member comprising a first drive means for said member, a second drive means for said member, a drive control means for supplying separate energizing signals to said first drive means and to said second drive means to drive said first and said second drive means in opposite directions, said control means including means for varying the effective ratio of said energizing signals whereby to affect the motion of said member, selection means for selecting predetermined effective ratios of said energizing signals whereby to control the motion of said moving member by means of the relative effect of said drive means, said selection means including stop means for selecting an effective ratio of said energizing signals which is effective to reverse the present motion of said moving member, and switch means responsive to the motion of said moving member to terminate said energizing signals upon a reversal of the motion of said moving member.

2. A control apparatus as set forth in claim 1 wherein said switch means is actuated by one of said drive means.

3. A control apparatus as set forth in claim 2 wherein said switch means comprises a magnetic field producing member, a magnetically responsive switch and an actuating means for transferring the motion of one of said drive means to said member to effect an operative relationship between said member and said switch.

4. A control apparatus for a moving member comprising a first drive means for said member, a second drive means for said member, said first drive means and said second drive means each including a drive motor and means for transferring the motion of said drive motor to said moving member to affect the motion of said member, a drive control means for supplying separate energizing signals to said first drive means and to said second drive means in opposite directions, said control means including means for varying the effective ratio of said energizing signals whereby to affect the motion of said moving member by means of the relative effect of said drive means, said selection means including a stop means for selecting an effective ratio of said energizing signals which is effective to reverse the motion of said moving member, and switch means responsive to the motion of said moving member to terminate said energizing signals upon a reversal of the motion of said moving member.

5. A control apparatus for a web member moving between two storage reels comprising a first drive means for one of said reels, a second drive motor for the other of said reels, control means for supplying separate energizing signals to said first drive means and to said second drive means to drive said first and said second drive means in opposite directions, said control means including means for varying the effective ratio of said energizing signals whereby to affect the motion of said web by controlling the relative motion of said reels, speed selection means for selecting predetermined effective ratios of said energizing signals whereby to control the motion of said moving web, said selection means including a stop means for selecting an effective ratio of said energizing signals which is effective to reverse the present motion of said reels, and switch means driven by one of said drive means and responsive to the motion thereof to terminate said energizing signals upon a reversal of this motion.

6. A control apparatus as set forth in claim 5 wherein said switch means comprises a magnetic field producing member, a magnetically responsive switch and an actuating means connected to one of said drive means to transfer the motion thereof to said member to effect an operative relationship between said member and said switch.

References Cited in the file of this patent

UNITED STATES PATENTS

| | | |
|---|---|---|
| 1,861,245 | Smith | May 31, 1932 |
| 2,519,218 | Bacheler et al. | Aug. 15, 1950 |
| 2,566,210 | Kendall et al. | Aug. 28, 1951 |
| 2,666,875 | Norton | Jan. 19, 1954 |
| 2,805,373 | Bonnell | Sept. 3, 1957 |

FOREIGN PATENTS

| | | |
|---|---|---|
| 434,611 | Great Britain | Sept. 5, 1935 |